(12) United States Patent
Takeda et al.

(10) Patent No.: US 11,758,538 B2
(45) Date of Patent: Sep. 12, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 88 days.

(21) Appl. No.: 16/612,636

(22) PCT Filed: May 12, 2017

(86) PCT No.: PCT/JP2017/018116
§ 371 (c)(1),
(2) Date: Nov. 11, 2019

(87) PCT Pub. No.: WO2018/207371
PCT Pub. Date: Nov. 15, 2018

(65) Prior Publication Data
US 2020/0100272 A1 Mar. 26, 2020

(51) Int. Cl.
*H04W 72/21* (2023.01)
*H04L 5/00* (2006.01)
*H04L 1/1812* (2023.01)
*H04W 80/02* (2009.01)

(52) U.S. Cl.
CPC ........... *H04W 72/21* (2023.01); *H04L 5/0048* (2013.01); *H04L 5/0055* (2013.01); *H04L 1/1812* (2013.01); *H04W 80/02* (2013.01)

(58) Field of Classification Search
CPC ... H04L 5/0048; H04L 5/0055; H04L 1/0031; H04L 1/08; H04L 1/16; H04L 1/1812;
(Continued)

(56) References Cited

U.S. PATENT DOCUMENTS

2006/0007887 A1* 1/2006 Kwon .................. H04L 1/1867
370/329
2013/0182789 A1* 7/2013 Ko ....................... H04B 7/0626
375/267
(Continued)

FOREIGN PATENT DOCUMENTS

EP 3364588 A1 * 8/2018 ............... H04L 5/00
JP 2017536036 A * 11/2017

OTHER PUBLICATIONS

ZTE (Basic grant-free transmission for URLLC, R1-1701594, Feb. 17, 2017) (Year: 2017).*
(Continued)

*Primary Examiner* — Zhensheng Zhang
(74) *Attorney, Agent, or Firm* — Osha Bergman Watanabe & Burton LLP

(57) ABSTRACT

According to one aspect of the present invention, a user terminal has a transmission section that performs UL grant-free transmission, in which UL data is transmitted without a UL transmission indication from a radio base station, and a control section that controls the UL grant-free transmission based on a configuration of the UL grant-free transmission, identified based on a physical layer signaling, and the transmission section transmits a delivery acknowledgment in response to receipt of the physical layer signaling. According to one aspect of the present invention, even when UL grant-free transmission is employed, the decline in communication throughput and the like can be reduced.

5 Claims, 9 Drawing Sheets

(58) Field of Classification Search
CPC ... H04L 1/1819; H04L 1/1861; H04L 5/0033; H04L 5/0051; H04L 5/0053; H04W 72/1284; H04W 74/08; H04W 80/02; H04W 28/04
See application file for complete search history.

(56) References Cited

U.S. PATENT DOCUMENTS

| | | | |
|---|---|---|---|
| 2016/0037567 A1* | 2/2016 | Lei | H04L 1/1671 370/329 |
| 2020/0045722 A1* | 2/2020 | Bae | H04W 72/1242 |

OTHER PUBLICATIONS

International Search Report issued in PCT/JP2017/018116 dated Aug. 1, 2017 (1 page).
Written Opinion of the International Searching Authority issued in PCT/JP2017/018116 dated Aug. 1, 2017 (4 pages).
NTT DOCOMO, Inc.; "UL data transmission without grant"; 3GPP TSG RAN WG1 Meeting #89, R1-1708479; Hangzhou, P.R. China; May 15-19, 2017 (4 pages).
Nokia, Alcatel-Lucent Shanghai Bell; "On L1 activation for UL grant-free URLLC transmission"; 3GPP TSG-RAN WG1 Meeting #89, R1-1708524; Hangzhou, P.R. China; May 15-19, 2017 (4 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Office Action issued in Chinese Application No. 201780092934.4, dated Jan. 18, 2023 (13 pages).

* cited by examiner

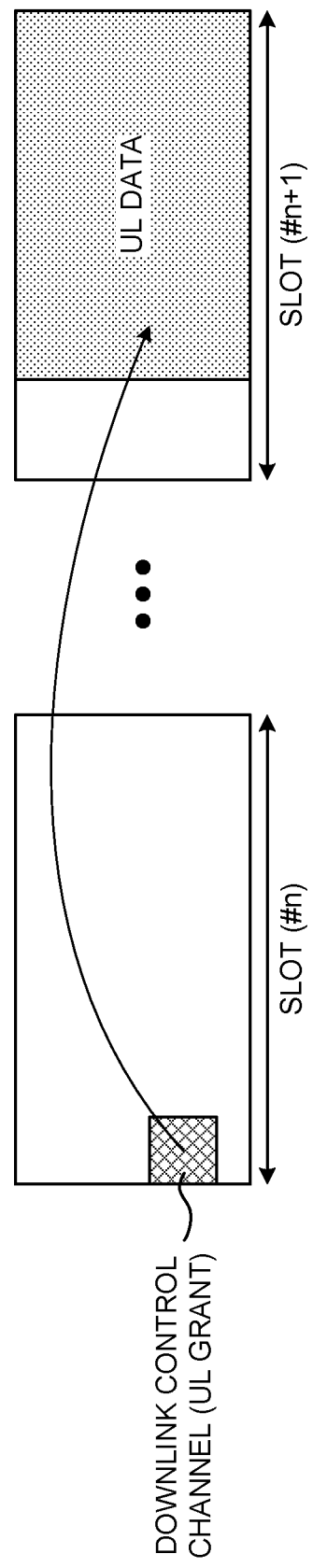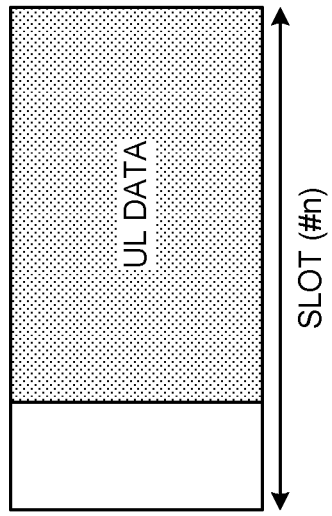
FIG. 1A
FIG. 1B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, LTE-A (LTE advanced and LTE Rel. 10, 11, 12 and 13) has been standardized for the purpose of achieving increased capacity and enhancement beyond LTE (LTE Rel. 8 and 9).

Successor systems of LTE are also under study (for example, referred to as "FRA (Future Radio Access)," "5G (5th generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rel. 8 to 13), downlink (DL) and/or uplink (UL) communication are carried out by using 1-ms subframes (also referred to as "transmission time intervals (TTIs)" and so on). These subframes are the time unit for transmitting 1 channel-encoded data packet, and serve as the unit of processing in, for example, scheduling, link adaptation, retransmission control (HARQ (Hybrid Automatic Repeat reQuest)) and so on.

Furthermore, a radio base station (for example, an eNB (eNode B)) controls the allocation (scheduling) of data to user terminals (UE (User Equipment)), and reports data scheduling commands to the UEs by using downlink control information (DCI). For example, when a UE conforming to existing LTE (for example, LTE Rel. 8 to 13) receives DCI that indicates UL transmission (also referred to as a "UL grant"), the UE transmits UL data in a subframe that is located a certain period later (for example, 4 ms later).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

In future radio communication systems (for example, NR), it is likely that data scheduling will be controlled differently than in existing LTE systems. For example, in order to provide communication services that require low latency and high reliability (for example, URLLC (Ultra Reliable and Low Latency Communications)), research is underway to reduce communication latency (latency reduction).

To be more specific, in order to reduce the latency time before UL data transmission is started, studies are in progress to perform communication by permitting contention in UL transmission among multiple UEs. For example, studies are in progress to allow UEs to transmit UL data without UL grants from radio base stations (also referred to as "UL grant-free transmission," "UL grant-less transmission," "contention-based UL transmission," etc.).

Research is underway to configure/re-configure, semi-statically, resource fields for allocating UL data for UL-grant free transmission. However, there is a problem, when UL grant-free transmission is run based completely on semi-static configurations, that flexible control is not possible. In this case, there may be a decline in communication throughput, spectral efficiency, and so forth.

It is therefore an object of the present invention to provide a user terminal and a radio communication method, whereby, even when UL grant-free transmission is employed, the decline in communication throughput and the like can be reduced.

Solution to Problem

According to one aspect of the present invention, a user terminal has a transmission section that performs UL grant-free transmission, in which UL data is transmitted without a UL transmission indication from a radio base station, and a control section that controls the UL grant-free transmission based on a configuration of the UL grant-free transmission, identified based on a physical layer signaling, and the transmission section transmits a delivery acknowledgment in response to receipt of the physical layer signaling.

Advantageous Effects of Invention

According to the present invention, even when UL grant-free transmission is employed, it is possible to reduce the decline in communication throughput and so forth.

BRIEF DESCRIPTION OF DRAWINGS

FIG. 1A is a diagram to explain UL grant-based transmission, and FIG. 1B is a diagram to explain UL grant-free transmission;

DESCRIPTION OF EMBODIMENTS

Envisaging future radio communication systems (including, for example, LTE Rel. 14, 15 and later versions, 5G, NR, etc., and hereinafter collectively referred to as "NR"), UL grant-based transmission, in which UL data is transmitted based on UL grants, is not enough by itself to enable communication with low latency, and it is necessary to employ UL grant-free transmission, in which UL data is transmitted without UL grants.

Here, UL grant-based transmission and UL grant-free transmission will be explained. FIG. 1A is a diagram to explain UL grant-based transmission, and FIG. 1B is a diagram to explain UL grant-free transmission.

In UL grant-base transmission, as shown in FIG. 1A, a radio base station (which may be referred to as, for example, a "base station (BS)," a "transmission/reception point (TRP)," an "eNode B (eNB)," a "gNB," etc.) transmits a downlink control channel (UL grant) that indicates allocation of UL data (PUSCH (Physical Uplink Shared CHannel)), and a UE transmits the UL data based on this UL grant.

Meanwhile, in UL grant-free transmission, as shown in FIG. 1B, a UE transmits UL data without receiving UL grants, which are provided for scheduling data.

Also, regarding UL grant-free transmission, studies are underway to repeat transmitting UL data. In repetition transmission of UL data, it is predictable that a UE repeats transmitting UL data a certain number of times (for example, K times) in transport block (TB) units. For example, the UE keeps transmitting TBs in response to UL data until downlink control information (UL grant) to indicate retransmission of UL data is transmitted, or until the number of times transmission is repeated reaches the above certain number of times.

Now, for NR, research is underway to provide support for configuring/re-configuring, at least semi-statically, resource fields for allocating UL data that is transmitted in UL-grant free transmission. Studies are underway to include at least physical, time and/or frequency domain resources in resource configuration.

For example, studies are in progress to configure resources for use in UL grant-free transmission, by higher layer signaling, as in UL semi-persistent scheduling (SPS), which is used in existing LTE (for example, LTE Rel. 8-13).

Figure 2:
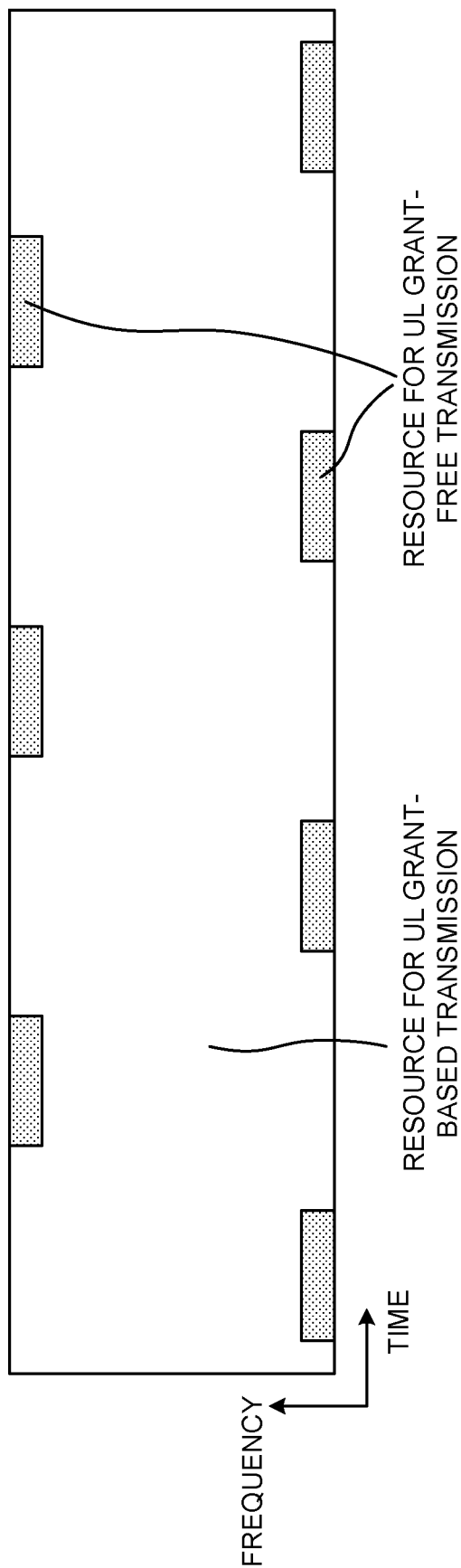
FIG. 2 is a diagram to show examples of resources for use in UL grant-free transmission.

FIG. 2 is a diagram to show example of resources for use in UL grant-free transmission. As shown in FIG. 2, inter-TTI frequency hopping, intra-TTI frequency hopping and the like may be applied to frequency resources for use in UL grant-free transmission. Also, time resources for use in UL grant-free transmission may be configured contiguously in time, or may be configured non-contiguously (intermittently) in time. Note that, resources other than those used in UL grant-free transmission may be used in UL grant-based transmission.

However, there is a problem, when UL grant-free transmission is run based completely on semi-static configurations, that flexible control is not possible. In this case, there may be a decline in communication throughput, spectral efficiency, and so forth.

So, the present inventors have come up with a method for controlling UL grant-free transmission in a flexible way, and arrived at the present invention. To be more specific, according to an example of the present invention, a UE dynamically updates and activates the parameters to use in UL grant-free transmission based on physical layer (L1 (Layer 1)) signaling. With this configuration, UL grant-free transmission can be indicated in a flexible fashion.

Also, according to an example of the present invention, a UE transmits a delivery acknowledgment (which may be also referred to as "delivery acknowledgment information," "delivery acknowledgment signal," etc.) that indicates success of receipt, in response to receipt of L1 signaling. This configuration allows the base station to learn whether the UE has been able to properly update the parameters to use in UL grant-free transmission, so that suitable control becomes possible.

Now, embodiments of the present invention will be described in detail below with reference to the accompanying drawings. Note that the radio communication methods according to the herein-contained embodiments may be used individually or may be used in combination.

Note that, in the following embodiments, the prefix "NR-," attached to an arbitrary signal or a channel, may be construed as meaning that the signal or the channel is designed for use in NR.

Furthermore, parameters used in UL grant-free transmission (which may be referred to as "radio parameters," "configuration information," etc.) may be referred to as "UL grant-free transmission parameters." Note that, the term "parameter" as used herein may mean a "parameter set," which is a set of one or more parameters.

(Radio Communication Method)

Figure 3:
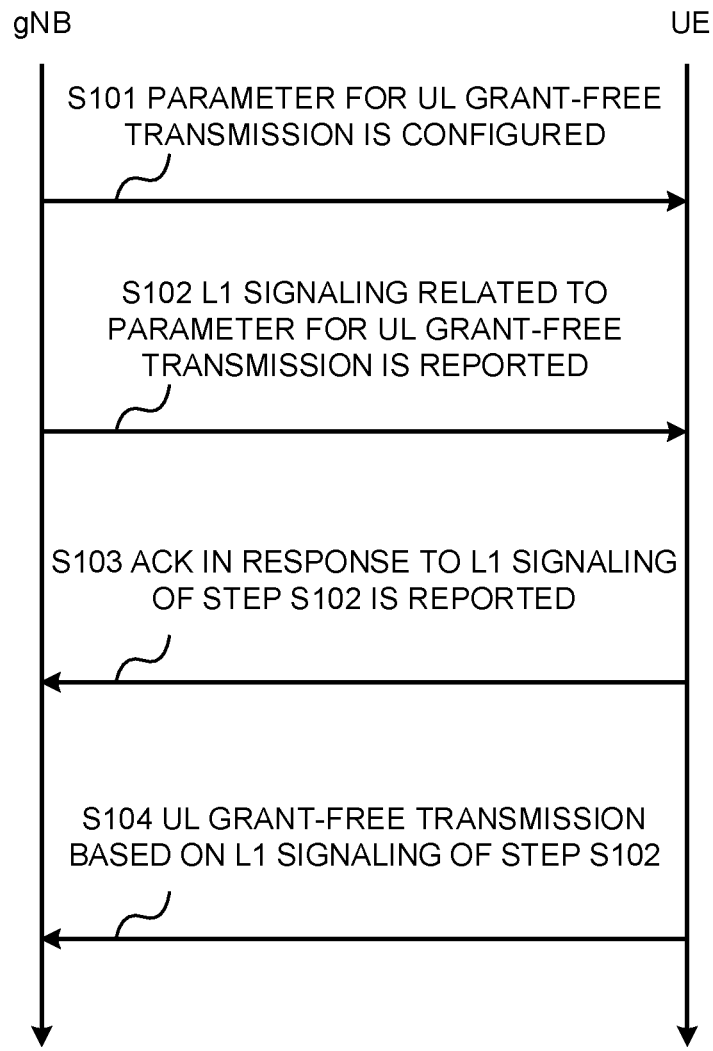
FIG. 3 is a diagram to show an example of the flow of UL grant-free transmission according to one embodiment of the present invention.

The flow of UL grant-free transmission according to one embodiment of the present invention will be described below with reference to FIG. 3. FIG. 3 is a diagram to show an example of the flow of UL grant-free transmission according to one embodiment of the present invention.

<Higher Layer Signaling for Reporting Parameters>

First, UL grant-free transmission parameters are configured by a gNB, in a UE, semi-statically, by way of higher layer signaling (for example, RRC (Radio Resource Control) signaling, broadcast information (MIB (Master Information Block), SIBs (System Information Blocks) and so on), MAC (Medium Access Control) signaling, and so forth) (step S101).

The UE can implement UL grant-free transmission based on this configuration information. Note that step S101 may be omitted, and UL grant-free transmission parameters may be specified in the specification.

The UL grant-free transmission parameters may include at least one of time and/or frequency resources, the modulation and coding scheme (MCS (which may include the redundancy version (RV)), reference signal parameters, the number of times to repeat UL grant free transmission (K), RV cycling (changing), parameters related to power ramping, random backoff, MCS adjustment in each repetition, etc.

Here, the time and/or frequency resources may be indicated by indices corresponding to time and/or frequency resources (for example, physical resource block (PRB) indices, cell indices, slot indices, subframe indices, symbol indices, and the like), the cycle of resources in the time and/or frequency direction, and so forth.

Note that some of the parameters (for example, parameters related to power ramping, RV cycling (changing), MCS adjustment, etc.) may be configured within a given number of repeated transmissions, or may be configured between repeated transmissions. For example, power ramping may be used within a repeated transmission, or the same transmission power may be used within a repeated transmission and power ramping may be applied between repeated transmissions.

Also, higher layer signaling to configure UL grant-free transmission parameters may be UE-common signaling or UE-specific signaling.

<L1 Signaling Related to UL Grant-Free Transmission Parameters>

Information related to UL grant-free transmission parameters is dynamically reported from the gNB to the UE by way of L1 signaling (for example, PDCCH (Physical Downlink Control CHannel), etc.) (step S102). The L1 signaling in step S102 may be referred to as "L1 signaling related to UL grant-free transmission parameters" and so on.

L1 signaling related to UL grant-free transmission parameters may be L1 signaling for reporting UL grant-free transmission parameters (also referred to as "parameter-reporting L1 signaling").

If parameters are reported via parameter-reporting L1 signaling, even if these parameters are configured via higher layer signaling (which may be interpreted as being specified in the specification, and this will the same hereinafter), the UE controls UL grant-free transmission based on the values of the parameter reported by L1 signaling.

Here, the parameters that are reported by L1 signaling might include parameters that, for example, override, update, adjust and modify radio parameters that are configured by higher layer signaling. Note that expressions such as "override" are examples, and it is obvious that they may be replaced with words synonymous with these expressions.

The parameters that are reported by parameter-reporting L1 signaling may include a subset of parameters configured by higher layer signaling, or may be a different set of parameters from the parameters configured by higher layer signaling (for example, parameters that are not configured by higher layer signaling may be reported via L1 signaling).

In addition, the parameters to be reported via parameter-reporting L1 signaling are by no means limited to UL grant-free transmission parameters for the same cell (the same carrier), and may be signaling that, for example, overrides, adjust and modifies UL grant-free transmission parameters for another cell (another carrier).

Note that which cell's (carrier's) UL grant-free transmission parameters are to be overridden, adjusted and modified may be configured in advance in the UE by higher layer signaling, or may be specified by a carrier indicator contained in this parameter-reporting L1 signaling. Whether or not this carrier indicator is included in parameter-reporting L1 signaling may be configured separately by higher layer signaling. By this means, the payload of L1 signaling can be controlled properly.

L1 signaling related to UL grant-free transmission parameters may be L1 signaling for activating the parameters (parameter sets) to use in UL grant-free transmission (also referred to as "activation L1 signaling").

Activation L1 signaling is used to activate a parameter set to use in UL grant-free transmission (words such as "enable" may be used here) out of a number of parameter sets configured by higher layer signaling in step S101. Note that a given parameter set and a command for activating this parameter set may be included in activation L1 signaling.

Also, activation L1 signaling may activate UL grant-free transmission parameters for the same cell (the same carrier), or activate UL grant-free transmission parameters for another cell (different carrier).

L1 signaling related to UL grant-free transmission parameters may be, for example, DCI for scheduling receipt of DL data (this DCI may include DCI format 1/2 and others, and may be referred to as "DL assignment"), or DCI for scheduling UL data transmission (this DCI may include DCI format 0/4 and others, and may be referred to as "UL grant"). In this specification, names such as "DL assignment," "UL grant," and others indicate that these DCIs and formats are the same or similar, and, in one embodiment of the present invention, these DCIs do not necessarily have to command data scheduling.

When one or more fields included in a DL assignment or a UL grant received (fields defined by the DCI format) each show a certain value, the UE may validate this DL assignment or UL grant as L1 signaling related to UL grant-free transmission parameters. Note that the combination and values of fields for use for this validation may be defined differently from the combination and values of fields for validating a DL assignment or a UL grant as SPS activation or release (deactivation).

<Delivery Acknowledgment in Response to Receipt of L1 Signaling>

If the UE successfully receives (decodes) and/or activates a parameter by way of L1 signaling, the UE may transmit a delivery acknowledgment that indicates receipt of the report/activation of the parameter, to the gNB. Following that, the UE performs UL grant-free transmission (for example, data transmission using resources for UL grant-free transmission) based on the L1 signaling in step S102 (step S104).

The delivery acknowledgment in step S103 may be L1 signaling (for example, HARQ-ACK (ACKnowledgment), etc.) or L2 signaling (for example, a certain MAC control element (MAC CE)). Depending on the type (for example, the DCI format) of the L1 signaling received in step S102, the UE may determine the signal and/or the channel for transmitting the above delivery acknowledgment.

For example, if the L1 signaling in step S102 is a UL grant, the delivery acknowledgment may be included in MAC signaling (for example, the MAC header, MAC CE, etc.) that is transmitted using the PUSCH. According to this configuration, the number of layers becomes smaller than in L3-based reporting (for example, RRC signaling), and so faster reporting/processing is possible. In addition, given that hybrid ARQ (HARD) is used, delivery acknowledgments can be provided at a low error rate compared to L1-based reporting.

For example, if the L1 signaling in step S102 is a UL grant or a DL assignment, and contains information that triggers a measurement reference signal (SRS (Sounding Reference Signal) (for example, the value of the SRS request field is not a non-triggering value such as "0" or "00")), the delivery acknowledgment may be transmitted by using an SRS. That is, a delivery acknowledgment in response to the above L1 signaling can be selected depending on whether an SRS is present or not. Although it is necessary to allocate resources when using the above MAC, according to this configuration, a delivery acknowledgment can be transmitted by using an SRS with a relatively small amount of resources, so that improved resource efficiency can be achieved.

Note that the above SRS that serves as a delivery acknowledgment may be subject to special rules that are different from those for normal SRS (that is, SRS that does not serve as delivery acknowledgment), and, for example, the priority of power scaling and/or dropping may be different from those of normal SRS (so that this SRS may be transmitted with priority over normal SRS).

The above SRS that serves as a delivery acknowledgment may be controlled not to be dropped even when it collides with data and/or CSI. Also, the above SRS that serves as a delivery acknowledgment may be controlled not to be dropped even when it collides with normal SRS.

Note that the above delivery acknowledgment may be transmitted using a reference signal other than SRS. For example, the above delivery acknowledgment may be transmitted by using a demodulation reference signal (DMRS) for UL grant-free transmission. In this case, the delivery acknowledgment may be specified based on at least one of the sequence and resource of the reference signal, the cyclic shift applied to the reference signal, the orthogonal code and the like.

Also, the above delivery acknowledgment may be reported by using a random access channel (PRACH (Physical Random Access CHannel)). In this case, the delivery acknowledgment may be specified based on at least one of the sequence and resource of the random access preamble transmitted using the PRACH, and the like.

The above delivery acknowledgment may be transmitted using an uplink control channel (for example, PUCCH (Physical Uplink Control CHannel)). In this case, the delivery acknowledgment may be specified by the PUCCH resource and so on.

The above delivery acknowledgment may be transmitted by using an uplink control channel when the L1 signaling in step S102 is a DL assignment. In this case, for example, resource for an HARQ-ACK in response to PDSCH may be used to transmit the above delivery acknowledgment.

The above delivery acknowledgment may be transmitted by using an uplink control channel when the L1 signaling in step S102 is a UL grant. In this case, for example, resource for a scheduling request (SR) may be used to transmit the above delivery acknowledgment. This SR resource may be specified by L1 signaling in step S102, may be configured by higher layer signaling (for example, RRC signaling), or may be defined by the specification in advance.

The UE may transmit an SR that is transmitted as a delivery acknowledgment as described above even when there is no data to be transmitted (buffer is empty). The gNB may determine that an SR that is received within a certain period from the transmission of L1 signaling in step S102 is a delivery acknowledgment in response to this L1 signaling.

Note that, if L1 signaling cannot be detected in step S102, the UE is likely not to (unable to) transmit a delivery acknowledgment in step S103. Therefore, it may be possible assume the status indicated by the delivery acknowledgment corresponds to either an ACK, which indicates success of receipt, or a NACK, which indicates failure of receipt, and which one applies may be defined in the specification in advance.

For example, the delivery acknowledgment of step S103, which is transmitted in an uplink control channel, may be defined so that it corresponds to an ACK, and may be referred to as a "PUCCH-ACK." A PUCCH-ACK may be reported by transmitting a certain signal in a PUCCH-ACK resource.

Information related to the above delivery acknowledgment may be reported explicitly or implicitly by L1 signaling or certain higher layer signaling (for example, RRC signaling) in step S102. In this case, the information related to a delivery acknowledgment may include at least one of the resource (for example, frequency resource, time resource (timing), etc.), the channel format, the signal format, the power control command and the like for transmitting the delivery acknowledgment.

The UE may specify the resource (for example, PUCCH resource, SRS resource, etc.) for transmitting the delivery acknowledgment based on the L1 signaling of step S102, and identify the resource based on the location of the resource (for example, the control channel element (CCE) index) where L1 signaling is received in step S102.

Note that the above delivery acknowledgment may be included in the UL grant-free transmission of step S104, may be transmitted simultaneously with this UL grant-free transmission, or may be transmitted at a different timing from this UL grant-free transmission. For example, if the above delivery acknowledgment is one of MAC signaling, SRS, PUCCH and SR, the delivery acknowledgment may be included in UL grant-free transmission, or may be transmitted simultaneously with this UL grant-free transmission.

<L1 Signaling for Deactivation>

At the UE, parameters that are reported by L1 signaling and/or activation of parameters by L1 signaling may be deactivated by different L1 signaling (words such as "disabled" may be used here). L1 signaling for deactivating parameter sets for use in UL grant-free transmission may be referred to as "deactivation L1 signaling."

The UE may deactivate resources for UL grant-free transmission reported by L1 signaling related to UL grant-free transmission parameters by deactivation L1 signaling. In this case, the UL grant-free transmission resource configured by the higher layer signaling may be used on an as-is basis (that is, UL grant-free transmission may be performed on the resource).

Also, the UE may deactivate UL grant-free transmission altogether (for example, all UL grant-free transmissions) by deactivation L1 signaling. For example, when deactivation L1 signaling is reported, the UE may deactivate both resources for UL grant-free transmission that are reported by L1 signaling related to UL grant-free transmission parameters, and resources for UL grant-free transmission that are configured by higher layer signaling.

Also, deactivation L1 signaling may deactivate UL grant-free transmission parameters for the same cell (the same carrier), or deactivate UL grant-free transmission parameters for another cell (different carrier).

Note that, if multiple parameter sets are already activated, information that specifies and deactivates one of these may be reported by way of deactivation L1 signaling.

If the UE successfully deactivates a parameter by way of deactivation L1 signaling, the UE may transmit a delivery acknowledgment that indicates receipt of this parameter's deactivation, to the base station. This delivery acknowledgment signal may be transmitted by way of L1 signaling (for example, as an HARQ-ACK), or L2 signaling (for example, a certain MAC CE).

The delivery acknowledgment in response to deactivation L1 signaling may be controlled in the same way the above-described delivery acknowledgment in response to L1 signaling related to UL grant-free transmission parameters is controlled. For example, a delivery acknowledgment in response to deactivation L1 signaling may be transmitted by using MAC signaling, SRS, PUCCH, SR, and the like.

A delivery acknowledgment in response to deactivation L1 signaling may be transmitted by using at least one of a different resource, a different channel format, a different signal format, a different power control command and so on, from that of the delivery acknowledgment in response to L1 signaling related to UL grant-free transmission parameters described above.

A delivery acknowledgment in response to deactivation L1 signaling may be transmitted by using, for example, the same resource as that of a delivery acknowledgment in response to L1 signaling related to UL grant-free transmission parameters, which has been described above. For example, when a delivery acknowledgment (PUCCH) in response to L1 signaling related to UL grant-free transmission parameters is represented by way of reporting a certain value (for example, "1") in a PUCCH-ACK resource, another value (for example, "0") may be reported in the same PUCCH-ACK resource may be reported to represent a delivery acknowledgment in response to deactivation L1 signaling.

According to one embodiment of the present invention described above, it is possible to control UL grant-free transmission in a flexible way. Also, by using delivery acknowledgment in response to L1 signaling, a base station can learn whether a UE has been able to update the parameters to use in UL grant-free transmission properly, so that suitable control becomes possible.

(Radio Communication System)

Now, the structure of a radio communication system according to one embodiment of the present invention will be described below. In this radio communication system, communication is performed using one of the radio communication methods according to the herein-contained embodiments of the present invention, or a combination of these.

Figure 4:
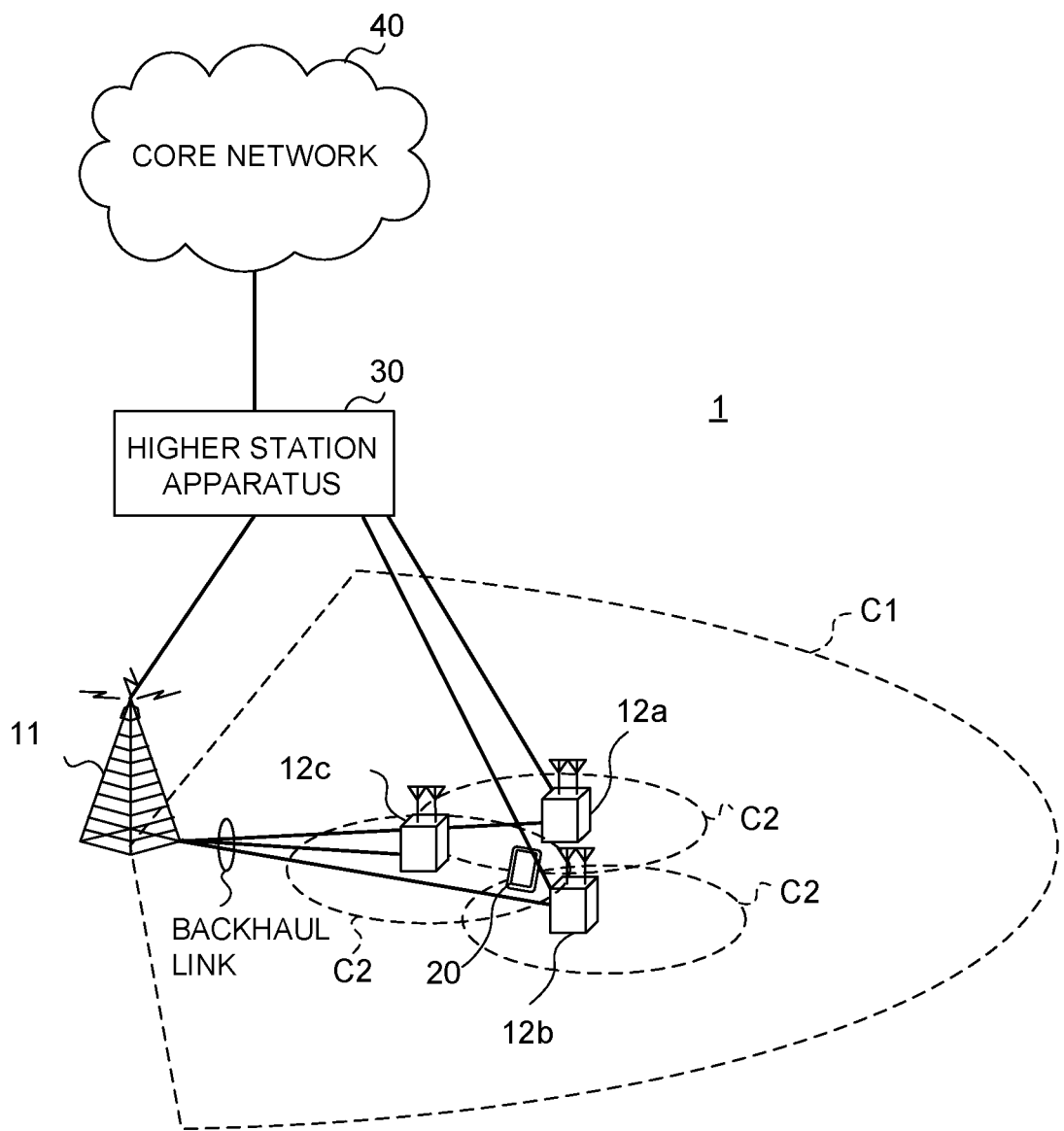
FIG. 4 is a diagram to show an exemplary schematic structure of a radio communication system according to one embodiment of the present invention.

FIG. 4 is a diagram to show an exemplary schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a plurality of different numerologies may be used.

The radio base station 11 and a radio base station 12 (or two radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 5:
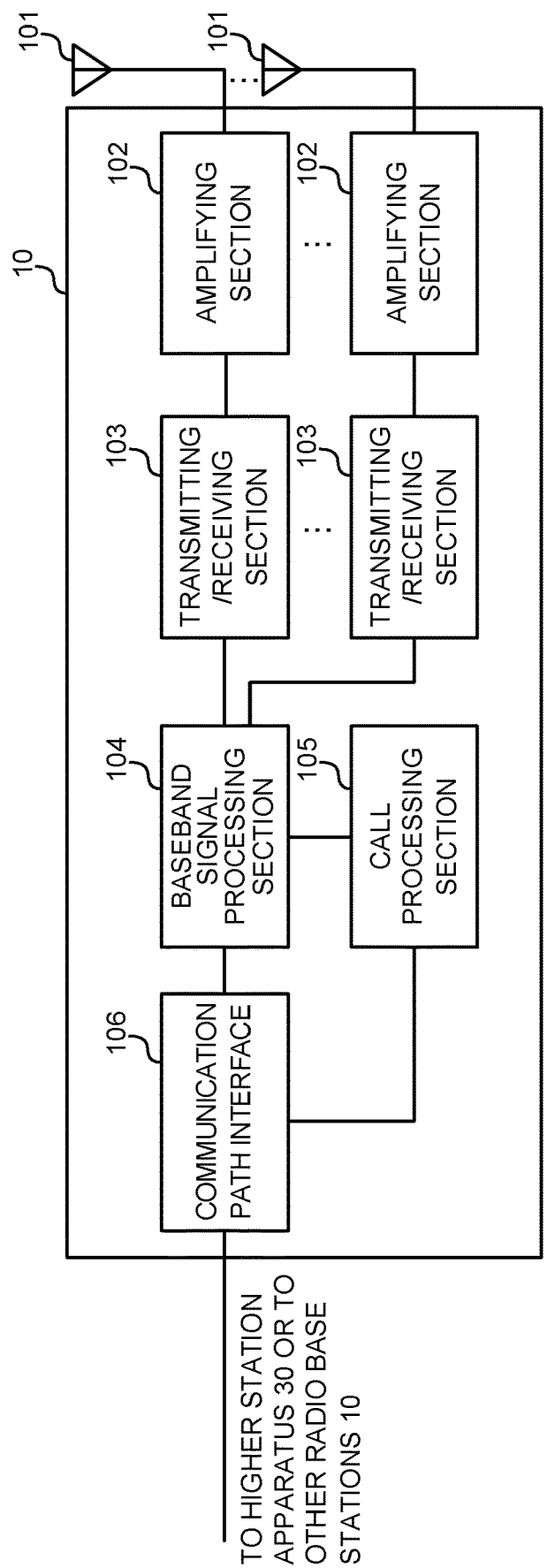
FIG. 5 is a diagram to show an exemplary overall structure of a radio base station according to one embodiment of the present invention.

FIG. 5 is a diagram to show an exemplary overall structure of a radio base station according to an embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 receive data from a user terminal 20, which is transmitted via UL grant-free transmission, in which UL data is transmitted without UL transmission commands (UL grants) from the radio base station 10.

In addition, the transmitting/receiving sections 103 may transmit at least one of L1 signaling for reporting parameters, L1 signaling for activation and L1 signaling for deactivation, to the user terminal 20.

After certain physical layer signaling (for example, parameter-reporting L1 signaling, activation L1 signaling, deactivation L1 signaling, etc.) is transmitted, the transmitting/receiving sections 103 may receive, from the user terminal 20, a delivery acknowledgment signal, which indicates whether the physical layer signaling has been received and/or has not been received, and which is transmitted using a certain signal and/or channel. For example, this delivery acknowledgment may be transmitted by using at least one of MAC signaling, SRS, PUCCH, and SR.

In addition, the transmitting/receiving sections 103 may transmit, to the user terminal 20, information related to UL grant-free transmission parameters, information related to delivery acknowledgment, and so on.

Figure 6:
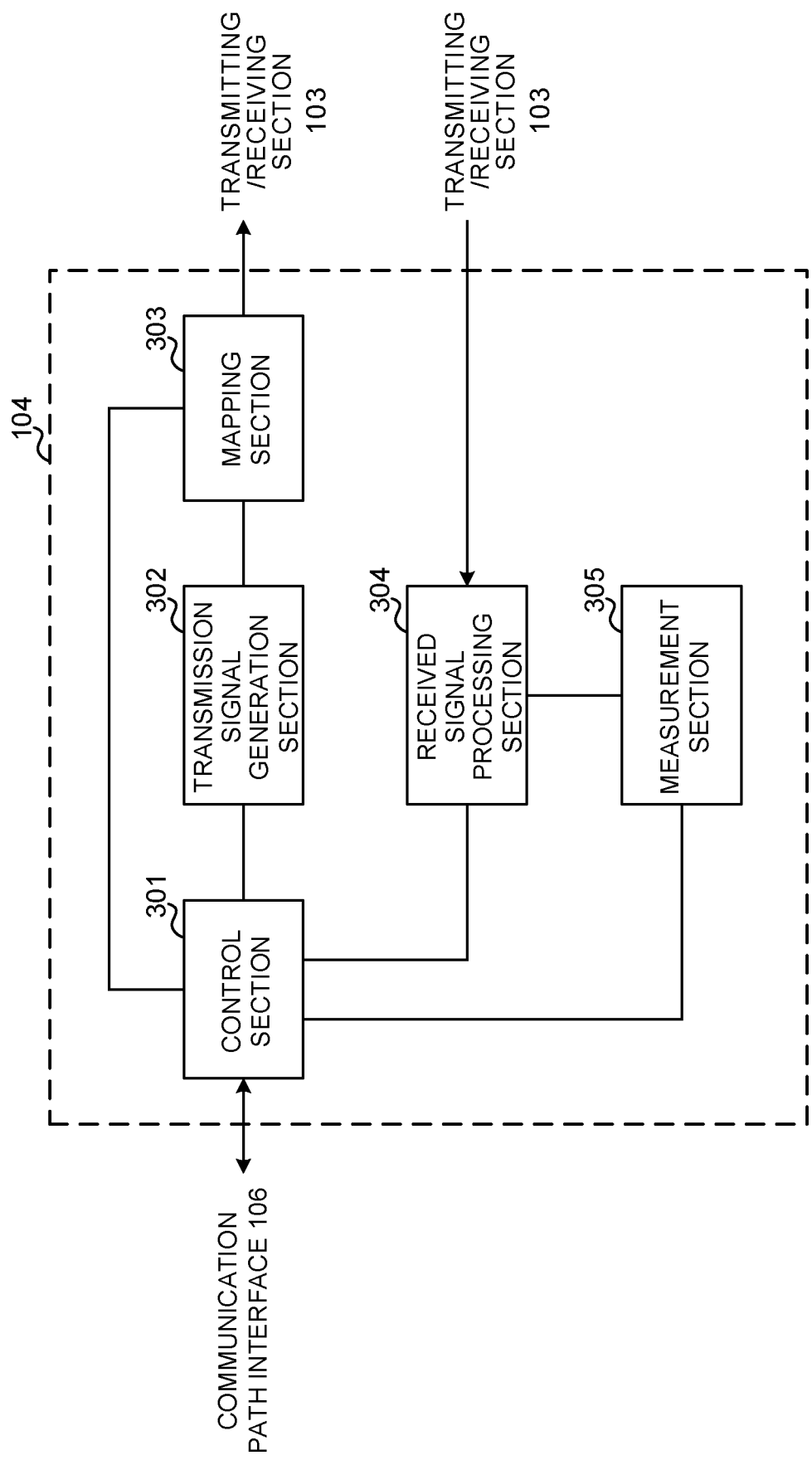
FIG. 6 is a diagram to show an exemplary functional structure of a radio base station according to one embodiment of the present invention.

FIG. 6 is a diagram to show an exemplary functional structure of a radio base station according to an embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 controls the transmission of physical layer (L1) signaling (at least one of L1 signaling for reporting parameters, L1 signaling for activation and L1 signaling for deactivation), so as to allow the user terminal 20 to identify (specify) the configurations of UL grant-free transmission.

Also, by means of the above physical layer signaling, the control section 301 may control based on which parameters UL grant-free transmission is to be performed, control whether UL grant-free transmission is employed or not, and so on.

The control section 301 may control the transmission of above physical layer signaling so as to allow the user terminal 20 to override and/or activate the parameters for UL grant-free transmission configured by higher layer signaling (for example, RRC signaling).

The control section 301 may control the transmission of certain physical layer signaling (for example, physical layer signaling apart from the above physical layer signaling for overriding and/or activation) so as to allow the user terminal 20 to deactivate at least one of the above-described overriding, activation and UL grant-free transmission.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to certain radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength Indicator)), transmission path information (for example, CSI), and so on. The measurement results may be output to the control section 301.

(User Terminal)

Figure 7:
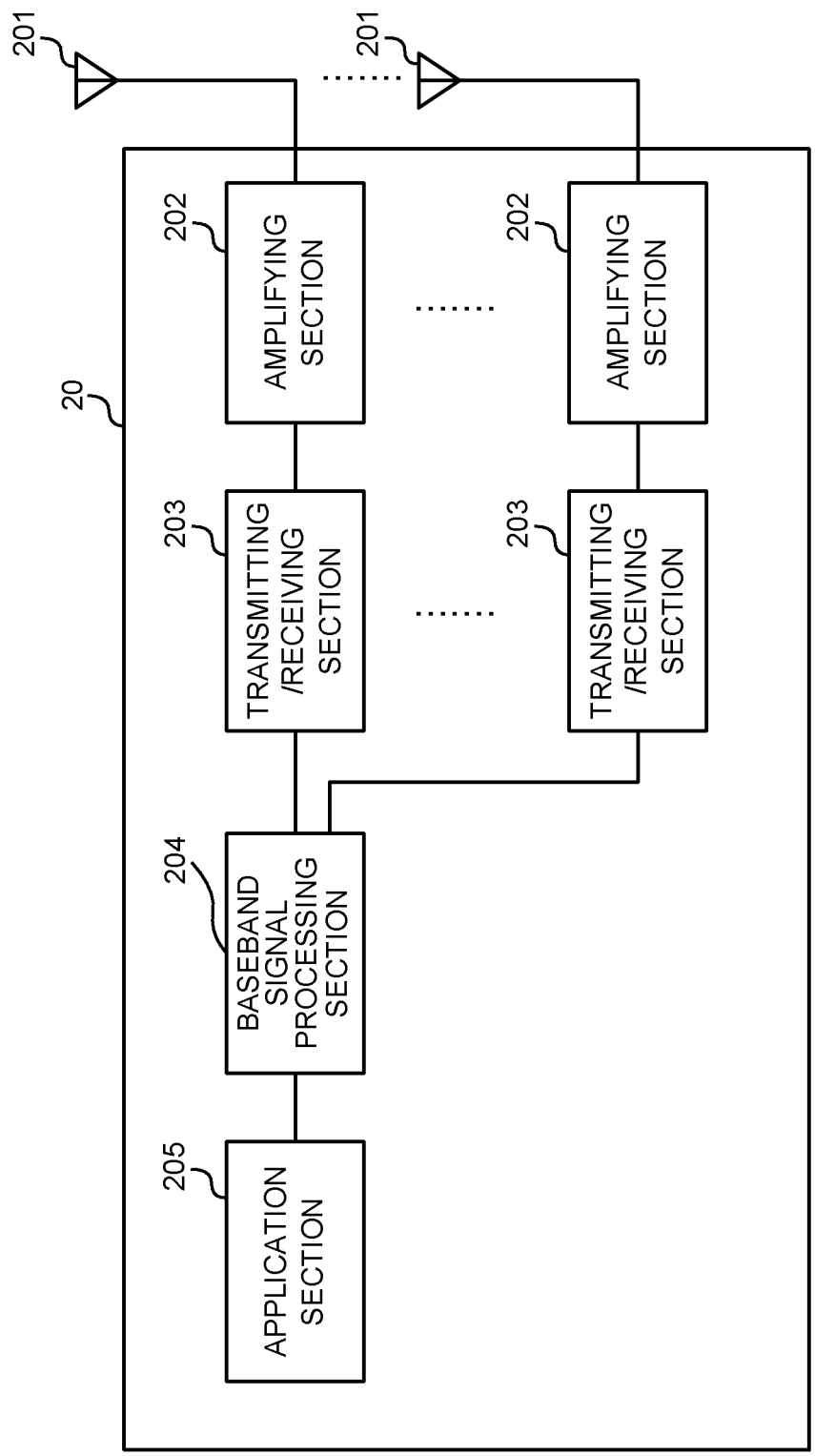
FIG. 7 is a diagram to show an exemplary overall structure of a user terminal according to one embodiment of the present invention.

FIG. 7 is a diagram to show an exemplary overall structure of a user terminal according to an embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit UL data without UL transmission indications (UL grants) from the radio base station 10.

Also, the transmitting/receiving sections 203 may receive at least one of L1 signaling for reporting parameters, L1 signaling for activation and L1 signaling for deactivation, from the radio base station 10.

When certain physical layer signaling (for example, parameter-reporting L1 signaling, activation L1 signaling, deactivation L1 signaling) is received and/or not received, the transmitting/receiving sections 203 may transmit a delivery acknowledgment signal that indicates that the physical layer signaling has been received and/or has not been received. For example, this delivery acknowledgment may be transmitted by using at least one of MAC signaling, SRS, PUCCH, and SR.

In addition, the transmitting/receiving sections 203 may receive information related to UL grant-free transmission parameters, information related to delivery acknowledgment, and so on, from the radio base station 10.

Figure 8:
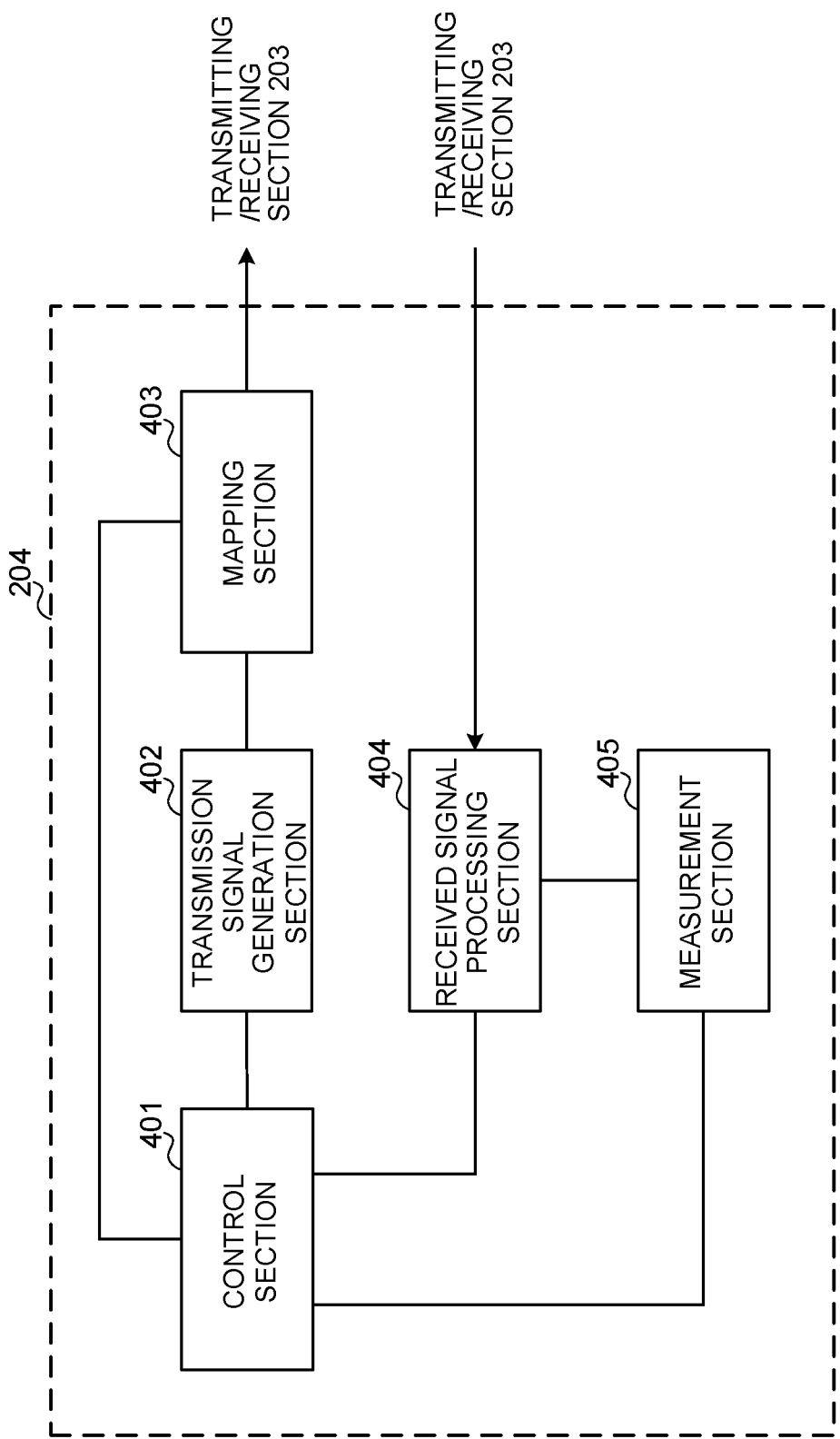
FIG. 8 is a diagram to show an exemplary functional structure of a user terminal according to one embodiment of the present invention.

FIG. 8 is a diagram to show an exemplary functional structure of a user terminal according to an embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 identifies (specifies) the configuration of UL grant-free transmission based on a physical layer (L1) signaling (for example, at least one of L1 signaling for reporting parameters, L1 signaling for activation and L1 signaling for deactivation) received from the received signal processing section 404.

In addition, the control section 401 controls UL grant-free transmission based on the identified configuration of UL grant-free transmission. Also, by means of the above physical layer signaling, the control section 301 may control based on which parameters UL grant-free transmission is to be performed, control whether UL grant-free transmission is employed or not, and so on.

The control section 401 may control UL grant-free transmission by overriding and/or activating the parameters for UL grant-free transmission configured by higher layer signaling (for example, RRC signaling) based on the above physical layer signaling. Note that the control section 401 may exert control so that the overriding and/or activation is allowed within a certain period after the above physical layer signaling is received, but is not allowed after this period expires.

The control section 401 may deactivate at least one of the above overriding, activation and UL grant-free transmission based on certain physical layer signaling (for example, physical layer signaling apart from the physical layer signaling for overriding and/or activation).

The control section 401 may exert control so as to transmit a delivery acknowledgment in response to receipt of the above physical layer signaling. The control section 401 may control the signal and/or the channel for transmitting the above delivery acknowledgment depending on the type (format) of the physical layer signaling.

For example, when the above physical layer signaling corresponds to a format (UL grant) for scheduling uplink data transmission (in other words, when the physical layer signaling is downlink control information of this format), the control section 401 may exert control so as to transmit the delivery acknowledgment by using MAC signaling.

When the above physical layer signaling corresponds to a format (UL grant) for scheduling uplink data transmission, the control section 401 may exert control so as to transmit the delivery acknowledgment by using an SRS.

When the above physical layer signaling corresponds to a format (DL assignment) for scheduling receipt of downlink data, the control section 401 may exert control so as to transmit the delivery acknowledgment by using an uplink control channel (for example, PUCCH).

When the above physical layer signaling corresponds to a format (UL grant) for scheduling uplink data transmission, the control section 401 may exert control so as to transmit the delivery acknowledgment by using a scheduling request (SR).

Also, the control section 401 may exert control so as to transmit the above delivery acknowledgment simultaneously with UL grant-free transmission.

Also, when various pieces of information reported from the radio base station 10 are acquired from the received signal processing section 404, the control section 401 may update the parameters used in the control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 9:
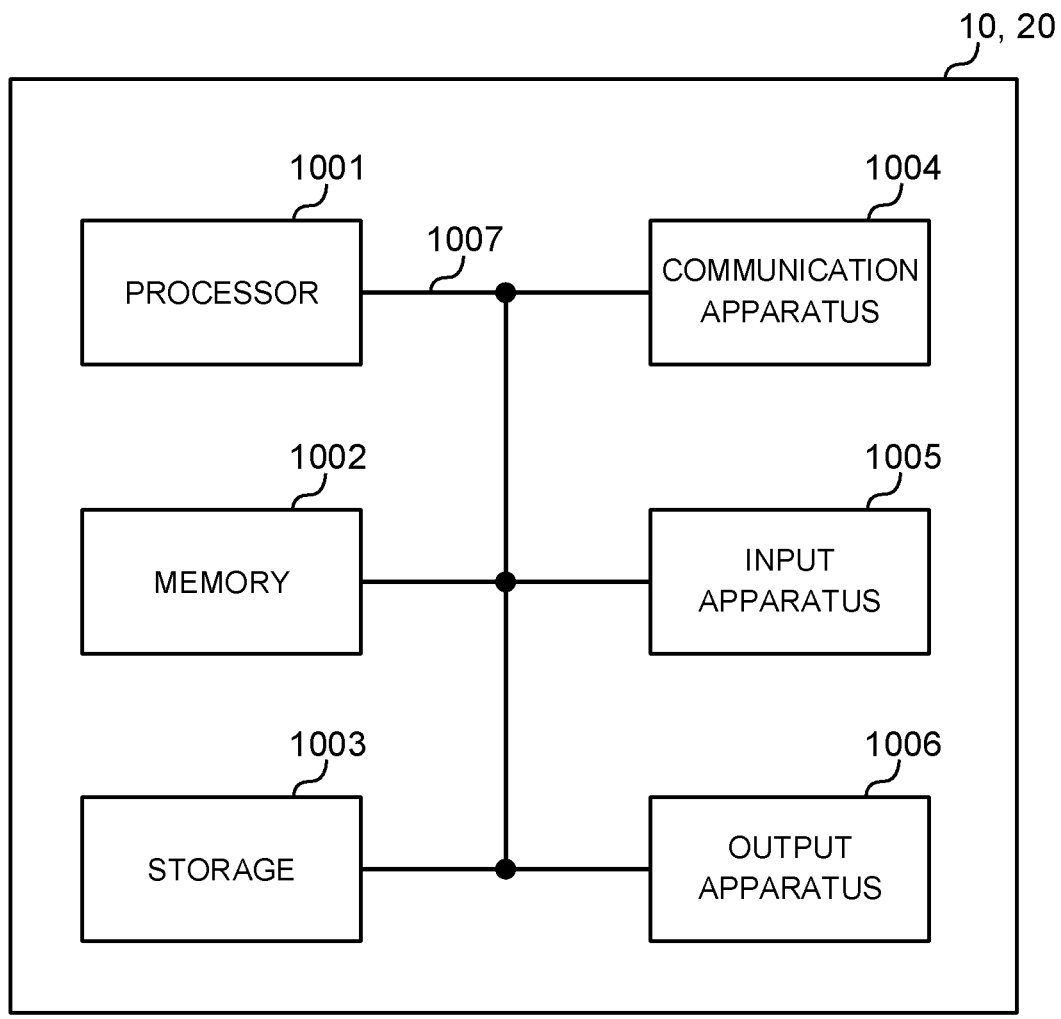
FIG. 9 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 9 is a diagram to show an exemplary hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read certain software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "mini-slot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to certain values, or may be represented using other applicable information. For example, a radio resource may be specified by a certain index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent in an implicit way (for example, by not reporting this piece of information, by reporting another piece of information, and so on). Decisions may be made in values represented by one bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives configuration of parameter sets for an uplink (UL) grant-free transmission whose resource is semi-statically configured;
a processor that controls the UL grant-free transmission based on the configuration of parameter sets activated by downlink control information (DCI); and
a transmitter that transmits a delivery confirmation for a reception of the DCI and performs the UL grant-free transmission,
wherein the transmitter determines, based on a format of the DCI, to transmit the delivery confirmation using a Medium Access Control Control Element (MAC CE),
the receiver receives a plurality of the configuration of parameter sets, and
when the plurality of the configuration of parameter sets are activated, the processor deactivates a configuration specified based on second DCI including information that specifies and deactivates one of the plurality of the configuration of parameter sets.

2. The terminal according to claim 1, wherein the processor deactivates all of the plurality of the configuration of parameter sets based on the second DCI.

3. A radio communication method for a terminal, comprising:
receiving configuration of parameter sets for an uplink (UL) grant-free transmission whose resource is semi-statically configured;
controlling the UL grant-free transmission based on the configuration of parameter sets activated by downlink control information (DCI);
transmitting a delivery confirmation for a reception of the DCI and performing the UL grant-free transmission;
determining, based on a format of the DCI, to transmit the delivery confirmation using a Medium Access Control Control Element (MAC CE);
receiving a plurality of the configuration of parameter sets; and
when the plurality of the configuration of parameter sets are activated, deactivating a configuration specified based on second DCI including information that specifies and deactivates one of the plurality of the configuration of parameter sets.

4. A base station comprising:
a transmitter that transmits, to a terminal, configuration of parameter sets for an uplink (UL) grant-free transmission whose resource is semi-statically configured and that transmits, to the terminal, downlink control information (DCI) for activating the configuration of parameter sets; and
a receiver that receives a delivery confirmation for a reception of the DCI in the terminal and that receives the UL grant-free transmission,
wherein the receiver determines, based on a format of the DCI, to receive the delivery confirmation using a Medium Access Control Control Element (MAC CE), and
when a plurality of the configuration of parameter sets are transmitted and the plurality of the configuration of parameter sets are activated, a configuration specified is deactivated based on second DCI including information that specifies and deactivates one of the plurality of the configuration of parameter sets.

5. A system comprising:
a terminal that comprises:
a first receiver that receives configuration of parameter sets for an uplink (UL) grant-free transmission whose resource is semi-statically configured;
a processor that controls the UL grant-free transmission based on the configuration of parameter sets activated by downlink control information (DCI); and
a first transmitter that transmits a delivery confirmation for a reception of the DCI and performs the UL grant-free transmission,
wherein the transmitter determines, based on a format of the DCI, to transmit the delivery confirmation using a Medium Access Control Control Element (MAC CE),
the receiver receives a plurality of the configuration of parameter sets, and
when the plurality of the configuration of parameter sets are activated, the processor deactivates a configuration specified based on second DCI including information that specifies and deactivates one of the plurality of the configuration of parameter sets, and
a base station that comprises:
a second transmitter that transmits, to the terminal, the configuration of parameter sets and that transmits, to the terminal, the DCI; and
a second receiver that receives the delivery confirmation and that receives the UL grant-free transmission.

* * * * *